(12) United States Patent
Kase et al.

(10) Patent No.: US 6,611,791 B1
(45) Date of Patent: Aug. 26, 2003

(54) METHOD FOR COMBINING PARTIALLY MEASURED DATA

(75) Inventors: Kiwamu Kase, Wako (JP); Hideo Tashiro, Wako (JP)

(73) Assignee: Riken (JP)

( * ) Notice: Subject to any disclaimer, the term of this patent is extended or adjusted under 35 U.S.C. 154(b) by 0 days.

(21) Appl. No.: 09/572,340

(22) Filed: May 18, 2000

(30) Foreign Application Priority Data

May 27, 1999 (JP) .......................................... 11-147756

(51) Int. Cl.[7] .............................................. G06F 15/00
(52) U.S. Cl. ........................ 702/167; 702/166; 382/284
(58) Field of Search ................................ 702/167, 155, 702/166; 356/450, 511; 382/154, 284, 278, 108

(56) References Cited

U.S. PATENT DOCUMENTS 5,831,621 A    11/1998  Pito
5,960,379 A  * 9/1999  Shimizu et al. ............. 702/155
5,987,189 A  * 11/1999 Schmucker et al. ........ 382/284
6,078,701 A  * 6/2000  Hsu et al. ................... 382/154

FOREIGN PATENT DOCUMENTS

JP          10-160428 A       9/1998

* cited by examiner

*Primary Examiner*—John Barlow
*Assistant Examiner*—Stephen Cherry
(74) *Attorney, Agent, or Firm*—Griffin & Szipl, P.C.

(57) ABSTRACT

(A) The surface shape of an object (1) is measured by varying the position and/or direction of measurement, and a plurality of sets of partially measured data (2) including the common parts (2a) are acquired, (B) for all the partially measured data (2), the overlapped ranges (3a) of the adjacent common parts (2a) are determined within the measurement error ranges (3), (C) when there are no superposition ranges (3a), it is decided that a combination is not possible, and (D) when there are overlapped ranges (3a), the common parts of each set of partially measured data are combined within the ranges. Thus, combined data can be created at a high accuracy from a plurality of sets of partially measured data based on a small number of repeated calculations.

5 Claims, 1 Drawing Sheet

METHOD FOR COMBINING PARTIALLY MEASURED DATA

BACKGROUND OF THE INVENTION

1. Technical Field of the Invention

The present invention relates to a method for combining partially measured data obtained from measurements taken on a large number of places on a free form surface by joining the measured data together.

2. Prior Art

When the surface of an object is so wide that the entire surface cannot be measured in one operation, such as when measuring the geometrical data of the surface of an automobile mock-up model, a three-dimensional coordinate measuring machine (digitizer) is used to measure sections of the surface of the object which partially overlap each other, and the measured data for the parts are combined together (stitched).

More explicitly, when using no contact measuring instrument such as an aperture interferometer or range finder, if the total Information about an object cannot be obtained in one measuring operation, the sensor or the object being measured is translated and rotated in three-dimensional space, the partially measured data (the set of measurement points obtained from the sensor at one location) are collected and then processed numerically, and he three-dimensional shape information about the object is reconstructed.

In general, "measurement" means determining the accuracy by comparing the data to some ideal reference information such as design data, and "digitizing" is used for the case in which no such reference information is used. Typically, obtaining a numerical data of a natural object or an industrial design (for instance, the clay model of an automobile) means "digitizing." In other words, both measurement and digitizing mean that a set of three-dimensional coordinate information is obtained using any type of sensor at sufficiently close intervals that details of the information can be reproduced in a computer; the systems are called "measuring instrument" and "digitizer" for the former and the latter, respectively.

The present invention, according to the aforementioned definition, relates to "digitizing" without reference to other information concerning the object being measured (design drawings such as CAD data). However, both digitizing and measurement are generally called "measurement" in the following paragraphs. In addition, the object being measured is assumed to be a continuous body without holes or discontinuities. Furthermore, the partially measured data must overlap and be measured or digitized.

Conventional methods for combining or registration of such data measured in parts, known in the prior art, include the simple combination method and the fitting combination (registration) method. In the simple combination method, partial surfaces are combined relying only on the accuracy of determining the position of the stage. However, there is the problem of low accuracy due to the introduction of Abbe's error. The fitting combination method adjusts the positions and angles of the partial surfaces so that the parts of the partial surfaces which overlap each other are overlapped as smoothly as possible. However, this method has the problem that errors accumulate in proportion to the 3/2 power of the number of combination cycles.

Methods for solving these problems include one in which two part al surfaces are first overlapped, and then other partial surfaces are added to the overlapped one, one after another, as disclosed in "Study on registration of range images" (by Ikuko Shimizu, Doctorate Thesis, Tokyo University).

According to this combination method, however, when combining N sets of partially measured data, the N-th set overlaps (N−1)-th sets that have been combined together, and then, to avoid cumulative errors, the coordinates of the data that have already been overlapped must be transformed again. As a consequence, to combine N sets of partially measured data, the coordinates must be transformed $1+2+ \ldots +N=(1+N) N/2$ times, that is, this method has the problem that the data processing time increases in proportion to substantially the square of the number N of sets of data to be combined.

Another proposed method is the "Shape measuring methods and apparatus" (unexamined Japanese patent publication No. 160428, 1998). This method combines the fitting combination method for fitting and connecting data in the normal directions of the overlapping surfaces only with the simple combination method in which coordinates are directly transferred, trusting on information from the machine.

The advantage of this method is its capability for combining quickly and very precisely, despite a rather simple procedure. In detail, the partial data are combined in one direction (straight or zigzag), and the fitting combination method is applied only in one direction at each step, so the total data processing time is substantially proportional to the number, N, of sets being combined.

However, because the fitting combination method is applied only In one direction in this method, only forward and backward continuity is taken into account. Therefore although no cumulate errors are produced, there is the problem that continuity in the transverse direction cannot be included. In addition, by considering fitting only in the normal direction, measurement errors for the other five components (two translational components and three rotational components) are ignored under the assumption that the measurement errors will be distributed evenly. However, the errors may not be negligible depending on the characteristics of the measuring instrument or digitizer, so the problem with this method is low analysis accuracy.

SUMMARY OF THE INVENTION

The present invention is aimed at solving these problems. More explicitly, an object of the present invention is to provide a method of combining partially measured data whereby highly accurate combined data can be created from a plurality of sets of partially measured data, using a small number of iterative calculations.

The present invention provides a method of combining partially measured data, wherein (A) the surface shape of an object (1) is measured by changing locations and/or directions, and a plurality of sets of partially measured data (2) including the common parts (2a) are collected, (B) the ranges (3a) over which adjacent common parts (2a) are overlapped in the measurement error ranges (3) are determined for all partially measured data (2), (C) if there are no ranges (3a) where the parts are overlapped, combining is judged to be impossible, and (D) when there are ranges in which the parts (3a) are overlapped, the common parts of each set of partially measured data are combined over the overlapped ranges (3a).

According to this method, because the ranges (3a) in which adjacent common parts (2a) are overlapped are determined in the measurement error ranges (3) for all sets of partially measured data (2), as described in the above-mentioned (B), whether or not overlapped ranges (3a) exist can be determined very rapidly. When there are no overlapped ranges (3a), the measurement data contain errors that are larger than the expected measurement error by design specification. Therefore, if iterative calculations are made for the combination, no solution can be ultimately obtained. Therefore, time-consuming repetitive computations can be avoided by mating a judgment to enable comb nation in case (C) in which there are no overlapped ranges (3a).

In addition, even when there are overlapped ranges (3a) in the aforementioned (D), the common parts of each set of partially measured data are combined only in the overlapped ranges of the measurement error ranges (3). Therefore, the ranges over which the coordinates of the data are transformed during combination are so narrow that wasteful iterated calculations can be minimized.

Moreover, since the common parts of each partially measured data are-combined sequentially using four fixed ranges (3a) of measurement error ranges (3), when N sets of partially measured data are combined, no errors accumulate, so it is unnecessary to re-transform the coordinates of the data which have already been overlapped. As a result, N coordinate transformations are sufficient to combine N sets of partially measured data. Therefore, combining can be completed in a processing time substantially proportional to the number of sets N being combined.

According to a preferred embodiment of the present invention, in the above-mentioned (D), (E) the coordinates of each set of partially measured data are transformed so that the position data for a group of common parts (2a) fall within the overlapped ranges (3a), (F) next, the common parts (2a) of each set of partially measured data are combined while the common parts still remain in the overlapped ranges (3a) even after the coordinates have been transformed.

According to the aforementioned methods, only the group of position data for the common parts (2a) in the overlapped ranges (3a) has its coordinates transformed, therefore the ranges over which the coordinates of the data are transformed during combination are narrow and the amount of position data is small, so that the calculation time can be reduced.

Furthermore, since the common parts are combined while the common parts (2a) of each set of partially measured data still remain in the overlapped ranges (3a) even after the coordinates have been transformed, no errors accumulate and the coordinates of the whole of the partially measured data can be transformed quickly.

Other objectives and preferred advantages of the present invention are disclosed in the following paragraphs referring to the attached drawings.

DESCRIPTION OF PREFERRED EMBODIMENTS

Figure 1A:
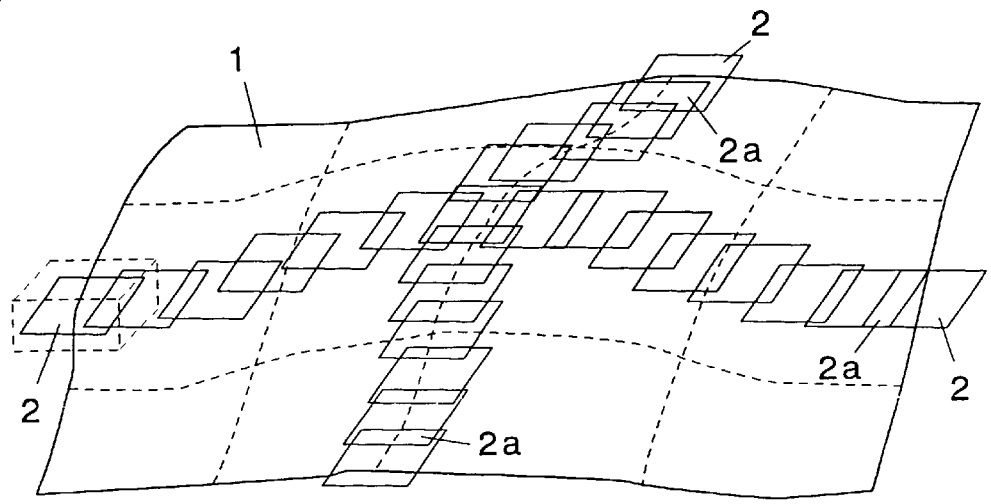
FIG. 1A is a conceptual view of the first step of the method for combining partially measured data according to the present invention.

Preferred embodiments of the present invention are described below referring to the drawings.

Figure 1B:
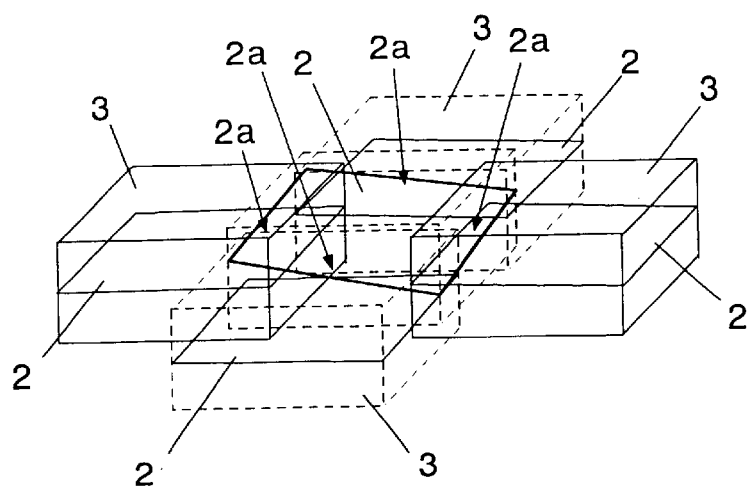
FIGS. 1B and 1C are sketches of the second step thereof.
Figure 1C:
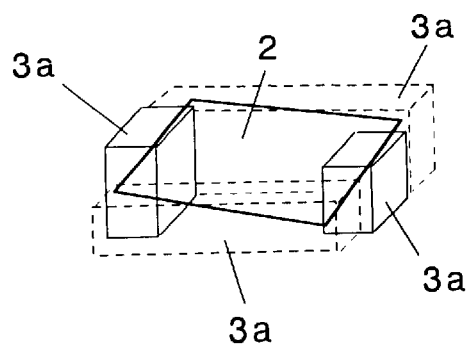

FIG. 1A is a sketch showing the first step of the method of combining partially measured data according to the present invention, and FIGS. 1B and 1C generally show the second step of the method.

According to the method of the present invention, as shown in FIG. 1A, the surface shape of the object 1 is measured by changing the positions and/or directions of measurement, and a plurality of sets of partially measured data 2 including those of common parts 2a are determined. This object 1 being measured is a continuous body without holes or discontinuities, such as a mock-up model of an automobile.

Continuity levels are predetermined, for instance, by the following four step procedure which assumes that an identity tolerance (IDTOL) has been given beforehand, whereby a group of measurement points of partially measured data 2 can be regarded as being identical.

The predetermined continuity levels include G0 (also referred to as "Point contact"), G1 (also referred to as "Line contact"), G2 (also referred to as "Surface contact"), and G3 (also referred to as "Coincidence of texture"), which are defined below as follows:

G0: The distance between a pair of points belonging to two adjacent groups of partial measurement points is IDTOL or less. (Point contact)

G1: All distances between pair of points included in an overlapping part in the outermost portion of two adjacent groups of partially measured points are IDTOL or less. (Line contact)

G2: For all pairs of points included in an overlapping part of two adjacent groups of partially measured points (called boundary point groups), the approximate tangents defined for each pair totally coincide.

Surface Contact

G3: For all pairs of points included in a boundary point group of two adjacent groups of partially measured points, the distribution of approximate principal curvatures defined for each pair totally coincide.

Coincidence of Texture

The texture is the geometrical pattern of a surface.

For a measurement, a no contact measuring instrument or digitizer such as an aperture interferometer or a range finder is used. In addition, partially measured data 2 are measured and/or digitized so that there is an overlap at all times.

Next, as shown in FIGS. 1B and 1C, the overlapped ranges 3a of adjacent common parts 2a in the measurement error ranges 3 are determined for all partially measured data 2. The measurement error ranges 3 include the positioning accuracies of the no contact measuring instrument or digitizer as well as the measurement errors of the sensor.

According to the present invention, then rough checking and fine stitching are carried out. In rough checking, a check is made beforehand as to whether or not a solution may exist; the existence of a solution is checked for each of the levels of continuity (the above-mentioned G0, G1, G2 and G3) for a predetermined tolerance (registration tolerance) in the measurement error ranges 3 consisting of sensor positioning errors, quantization errors, and sensing errors.

In detail, each polyhedron (in the measurement error ranges) obtained by offsetting each partially measured data point 2, as described below, is intersected by a set of a maximum of four adjacent ranges, and when the intersection is an empty set, it is concluded that there is no solution.

In other words, the inability to make a combination is decided when there are no overlapped ranges 3a in the aforementioned measurement error ranges 3 in (c) above.

Next in fine stitching, as the first step, when rough checking has shown that a solution (an intersection) exists, the coordinates of each view (partially measured data) are transformed so that the boundary point group falls in the product range. The number of transformation operations at this time is N when N sets of partially measured data are being combined (0(n)).

As the second step, next, the continuity at each of the levels G0 to G3 is adjusted while the four corners of each view are kept in the intersection range. At that time, the product range is fixed in the absolute coordinates, so there are no cumulative errors.

The algorithm for the fine stitching is described below.

Partially measured data, obtained using a sensor such as an interferometer, which has a higher accuracy than the positioning accuracy, are joined together using a positioning mechanism into a complete image; the image can be regarded as a rigid body (a three-dimensional body which cannot be deformed) because of the difference in the accuracies. For this situation one can use the analogy that the partially measured data are considered as individual rigid parts, and that they are combined into an assembly.

A rigid body can be represented by a point fixed to the body (called the Representing Point for short) and three orthogonal coordinates (posture). The Representing Point can be the center of gravity, for example, and travels when the rigid body moves. The Representing Point need not be inside the rigid body.

First, the conditions for the incorporation of the boundary point group of the four corners of the partially measured data in a product range that has already been obtained by rough checking, can be expressed by a set of linear inequalities (that is, simultaneous linear inequalities) to determine the range in which the free, fixed points of the partially measured data can exist. Geometrically, this is equivalent to a polytope (a convex hull with only one peak).

Next, other partially measured data are added, and a contraction of the intersection space takes place as determined by the restrictions (the six inequalities on both sides) for the same Representing Point and the positional posture in the local coordinates. Only one product is formed (two inequalities are solved simultaneously, and the solutions are updated in a way that the ranges of the polyhedra become narrower).

To derive these ranges for each set of partially measured data, the positional vector of the center of gravity of the boundary point group of the four corners relative to the Representing Point is determined, and is rotated and translated by a linear approximation. In this way a new Representing Point and restrictions (simultaneous linear equations) to be satisfied in the local coordinates after incorporation are determined. (The scope of the Representing Point and postures of the rigid body after being translated and rotated differentially relative.to the reference (a linear approximation is substituted for this.)

The conditions for which the overlapped parts of the adjacent partially measured data are included in the product of the measurement error ranges can be expressed as a development from the condition that a point is included in a convex polyhedron (a set of linear inequalities).

More explicitly, each point in the rigid body is expressed by equation 1 (with an already known constant) with its center of gravity (g) and relative positional vector ($r_i$) from the center of gravity, and differential movements ($\Delta x_i$, $\Delta y_i$, $\Delta z_i$) and differential rotations ($\Delta a_i$, $\Delta b_i$, $\Delta c_i$) around the x, y and z axes are assumed for each set of partially measured data (with suffix i) in the measurement error ranges. And, the trigonometric functions included in the rotation are expanded as Taylor series and the second and higher terms are disregarded, thereby the coordinates are transformed by the second equation (with variables including $\Delta$ in a linear form) in the following equation 3, regardless of the sequence of the rotations. (Shigeki Toyama, "Robotics for Mechanical Systems," p. 157, Sogo Denshi Syuppansha (1998))

[Mathematical presentation 1]

$$g+r_i=[x_i,y_i,z_i]T \qquad (1)$$

$$[x'_i,y'_i,z'_i]T \qquad (2)$$

$$\begin{bmatrix} x'_i \\ y'_i \\ z'_i \\ 1 \end{bmatrix} = \begin{bmatrix} 0 & -\Delta_i^c & \Delta_i^b & \Delta_i^x \\ \Delta_i^c & 0 & -\Delta_i^x & \Delta_i^y \\ -\Delta_i^b & \Delta_i^a & 0 & \Delta_i^z \\ 0 & 0 & 0 & 0 \end{bmatrix} \begin{bmatrix} x_i \\ y_i \\ z_i \\ 1 \end{bmatrix} \qquad (3)$$

Therefore, the ranges in which the partially measured data can exist during the fine stitching are replaced by linear restrictions on six variables ($\Delta x_i$, $\Delta y_i$, $\Delta z_i$, $\Delta a_i$, $\Delta b_i$, $\Delta c_i$), i.e. the differential parallel and rotational components, for each set of partially measured data.

For two bodies, the continuity conditions for each of the cases of surface contact, line contact, and point contact are modified depending on the connection levels, while the positional vectors relative to the Representing Points are determined and the restrictions on the positions and postures relative to the Representing Points are increased, in the same way as for one body.

"Continuity conditions are modified" means that although the number of the aforementioned six variables is the same as the number of sets of partially measured data, the variables are not independent, but are restricted by the various continuity levels; for G3, the conditions are the same as for a one-body problem (0 degrees of freedom); for G2, two degrees of freedom are added which permit translation in a plane while the posture is fixed; for G1, one degree of freedom is added which permits a differential angular rotation for each connection about the rotational axis of the contact line, and two degrees of freedom are added to permit differential translation of the axis in a plane (three degrees of freedom in total); for G0, two degrees of freedom are added which permit differential angular rotations about axis through the center of the contact point, and two degrees of freedom are added which permit differential translation movements of the contact point in a plane (a total of four degrees of freedom).

These modifications are carried out as each set of partially measured data is connected by considering the continuity levels, and every time a continuity condition is modified, the Representing Points and positional posture restrictions in the local coordinates are increased, and the range in which they can exist is determined. In practice, a linear programming method is used.

An offset required to determine the measurement error ranges is described below. Assuming the following causes of measurement error are known, translation vectors are determined and moved by the following error forming computations A to E for the points representing the contour (outermost profile) of a group of points. A convex hull connecting the vectors is determined.

A. Parallel offset due to sensor positioning error

B. Rotational offset related to a rotary table

C. Offset due to quantization error

D. Offset caused by engineering distortion errors

E. Others

A method of obtaining a region from a group of points is disclosed, for example, in B. Chazelle: "An Optimal Convex Hull Algorithm in Any Fixed Dimension," Discrete Computational Geometry, 10:377–409, 1993.

In other words, (D) when there are overlapped ranges $3a$, (E) the coordinates of each set of partially measured data are transformed so that the group of positional data for the common parts $2a$ falls in the overlapped ranges $3a$, and (F) next, the common parts are combined while keeping the common parts $2a$ of each set of partially measured data in these overlapped ranges $3a$ even after the coordinates have been transformed.

According to the above-mentioned method of the present invention, before beginning to combine each set of partially measured data, (B) for all partially measured data 2, the overlapped ranges $3a$ of the adjacent common parts $2a$ are determined in the measurement error ranges 3, therefore the presence or absence of the overlapped ranges $3a$ can be identified very quickly. When there are no overlapped ranges $3a$, the measured data include errors that are greater than the inherent measurement errors, so even if the calculations are iterated during combination, no solutions can eventually be obtained. Therefore, (C) when here are no overlapped ranges ($3a$), a decision is made that a combination cannot be achieved to avoid useless repeated calculations.

In addition, (D) even when there are overlapped ranges $3a$, the common parts of each set of partially measured data are combined only for the overlapped ranges in the measurement error ranges 3, therefore, the range for transforming the coordinates of the data under combination is narrowed, and wasteful repetitive computation can be avoided.

Furthermore, because the common parts of each set of partially measured data are combined sequentially in the overlapped ranges $3a$ of the measurement error ranges 3, no errors accumulate when N sets of partially measured data are joined together, so the coordinates of data which have already been overlapped need not be transformed again. As a result, to combine N sets of partially measured data, only N coordinate transformations are sufficient, so that the data can be combined in a processing time that is substantially proportional to the number of sets, N, being combined.

As described above, according to the method of combining partially measured data disclosed in the present invention, various advantages can be provided, including a small number of repetitive calculations and a high-accuracy of the combined data, when using a plurality of sets of partially measured data.

Although the present invention has been described referring to several preferred embodiments, it should be understood that the scope of the rights included in the present invention is not limited only to these embodiments. Conversely, the scope of rights of the present invention includes all improvements, modifications and equivalent entities covered by the scope of the attached claims.

What is claimed is:

1. A method of combining partially measured three-dimensional data, comprising the steps of:

(A) measuring the three-dimensional surface shape of an object with a noncontact measuring device by varying the position or direction of measurement, or by varying the position and direction of measurement, followed by acquiring a plurality of sets of partially measured three-dimensional data which include common parts;

(B) for all sets of partially measured data, determining overlapped ranges for adjacent common parts in measurement error ranges;

(C) when there are no overlapped ranges, making a decision that no combination can be made; and (D) when there are overlapped ranges, combining the common parts of each set of partially measured three-dimensional data.

2. The method of combining partially measured three-dimensional data specified in claim 1, further comprising the steps of:

(E) transforming the coordinates of each set of partially measured three-dimensional data so that a positional data group of the common parts falls in the overlapped ranges in said step (D); and (F) combining the common parts while the common parts of each set of partially measured three-dimensional data are kept in the overlapped ranges even after the coordinates have been transformed.

3. The method of combining partially measured three-dimensional data as specified in claim 2, wherein said step of (F) transforming comprises moving the coordinates according to the trigonometric equations, wherein the trigonometric equations are expanded as a Taylor series and the second and higher terms are disregarded.

4. The method of combining partially measured three-dimensional data as specified in claim 3, wherein the equation for the step of transforming is the following:

$$g+r_i=[x_i,Y_i,z_i]T \quad (1)$$

$$[x'_i y'_i z'_i]T \quad (2)$$

$$\begin{bmatrix} x'_i \\ y'_i \\ z'_i \\ 1 \end{bmatrix} = \begin{bmatrix} 0 & -\Delta_i^c & \Delta_i^b & \Delta_i^x \\ \Delta_i^c & 0 & -\Delta_i^x & \Delta_i^y \\ -\Delta_i^b & \Delta_i^a & 0 & \Delta_i^z \\ 0 & 0 & 0 & 0 \end{bmatrix} \begin{bmatrix} x_i \\ y_i \\ z_i \\ 1 \end{bmatrix} \quad (3)$$

wherein:

g is a gravity point, ri is a relative positional vector, ($\Delta xi$, $\Delta yi$, $\Delta zi$) are differential movements, ($\Delta ai$, $\Delta bi$, $\Delta ci$) are differential rotations, and i is a suffix for partially measured data.

5. The method of combining partially measured three-dimensional data as specified in claim 1, wherein the measurement error ranges include sensor positioning errors, quantization errors and sensing errors.

* * * * *